United States Patent
Anand et al.

(10) Patent No.: US 9,652,790 B2
(45) Date of Patent: May 16, 2017

(54) OPEN DATA MARKETPLACE FOR MUNICIPAL SERVICES

(75) Inventors: Rangachari Anand, Teaneck, NJ (US); Stacy F. Hobson, Poughkeepsie, NY (US); Juhnyoung Lee, Yorktown Heights, NY (US); Jeaha Yang, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 13/163,274

(22) Filed: Jun. 17, 2011

(65) Prior Publication Data

US 2012/0323741 A1    Dec. 20, 2012

(51) Int. Cl.
   *G07G 1/10*    (2006.01)
   *G06Q 30/06*    (2012.01)

(52) U.S. Cl.
   CPC ................ *G06Q 30/0601* (2013.01)

(58) Field of Classification Search
   CPC .... G06Q 30/0641; G06Q 30/00; G06Q 30/08; G06Q 40/04
   USPC ..................... 705/27.1, 26.1, 26.3
   See application file for complete search history.

(56) References Cited

U.S. PATENT DOCUMENTS

| | | |
|---|---|---|
| 5,550,971 A | 8/1996 | Brunner et al. |
| 5,590,326 A | 12/1996 | Manabe |
| 5,649,102 A | 7/1997 | Yamauchi et al. |
| 5,872,850 A | 2/1999 | Klein et al. |
| 6,064,968 A | 5/2000 | Schanz |
| 6,256,676 B1 | 7/2001 | Taylor et al. |
| 6,327,594 B1 | 12/2001 | Van Huben et al. |
| 6,591,265 B1 | 7/2003 | Erickson et al. |
| 6,609,123 B1 * | 8/2003 | Cazemier .......... G06F 17/30607 |
| 6,738,975 B1 | 5/2004 | Yee et al. |
| 6,779,184 B1 | 8/2004 | Puri et al. |
| 7,114,146 B2 | 9/2006 | Zhang et al. |
| 7,131,057 B1 | 10/2006 | Ferrucci et al. |
| 7,237,225 B2 | 6/2007 | Kompalli et al. |

(Continued)

OTHER PUBLICATIONS

Webopedia, definition of Data Cleansing, http://www.webopedia.com/TERM/D/data_cleansing.html, Aug. 3, 2004.*

(Continued)

*Primary Examiner* — Andrew Joseph Rudy
(74) *Attorney, Agent, or Firm* — Scully, Scott, Murphy & Presser, P.C.; Kurt P. Goudy, Esq.

(57) ABSTRACT

Providing an open data marketplace may include identifying one or more data attributes from a plurality of applications registered with a shared data management system; mapping said one or more data attributes to a data model to create a first set of mapped data; augmenting said first set of mapped data with additional data imported into the shared data management system from other data locations to create an augmented set of mapped data; receiving one or more of second set of mapped data from one or more shared data management system associated respectively with one or more shared data management networks; enabling of composing a data set by combining and cleansing one or more of said first set of mapped data, said second set of mapped data, and said augmented set of mapped data; and offering said composed data set in a digital marketplace with associated pricing characteristics.

16 Claims, 5 Drawing Sheets

(56) References Cited

U.S. PATENT DOCUMENTS

| | | | |
|---|---|---|---|
| 7,293,010 B2 | 11/2007 | Angele et al. | |
| 7,305,392 B1 | 12/2007 | Abrams | |
| 7,509,326 B2 | 3/2009 | Krabel et al. | |
| 7,567,751 B2* | 7/2009 | Fabrizio | F24H 9/2028 392/465 |
| 7,571,447 B2 | 8/2009 | Ally et al. | |
| 7,603,300 B2 | 10/2009 | Haffner et al. | |
| 7,617,174 B2 | 11/2009 | Chen et al. | |
| 7,620,980 B1 | 11/2009 | Wood et al. | |
| 7,631,089 B2 | 12/2009 | Knauerhase et al. | |
| 7,640,204 B2* | 12/2009 | Florance | G06Q 10/087 705/1.1 |
| 7,707,066 B2* | 4/2010 | Roever | G06Q 20/04 705/27.1 |
| 7,725,429 B2 | 5/2010 | Rangadass et al. | |
| 7,814,025 B2* | 10/2010 | Roever | G06F 21/10 705/51 |
| 7,895,445 B1 | 2/2011 | Albanese | |
| 2003/0028469 A1* | 2/2003 | Bergman | G06Q 30/06 705/37 |
| 2003/0137539 A1 | 7/2003 | Dees | |
| 2003/0172145 A1* | 9/2003 | Nguyen | G06Q 10/10 709/223 |
| 2004/0107123 A1* | 6/2004 | Haffner | G06Q 30/02 705/30 |
| 2004/0128215 A1* | 7/2004 | Florance | G06F 17/30241 705/28 |
| 2005/0055556 A1 | 3/2005 | Shiu et al. | |
| 2006/0259923 A1 | 11/2006 | Chiu | |
| 2006/0287890 A1 | 12/2006 | Stead | |
| 2007/0220035 A1 | 9/2007 | Misovski | |
| 2007/0220588 A1 | 9/2007 | Panda et al. | |
| 2007/0239858 A1 | 10/2007 | Banerji et al. | |
| 2007/0282748 A1 | 12/2007 | Saint Clair | |
| 2008/0059543 A1 | 3/2008 | Engel | |
| 2008/0256467 A1 | 10/2008 | Chu | |
| 2008/0256607 A1* | 10/2008 | Janedittakarn | H04L 63/08 726/4 |
| 2009/0099852 A1* | 4/2009 | Ouimet | G06Q 30/0281 705/346 |
| 2009/0254971 A1* | 10/2009 | Herz | G06Q 10/10 726/1 |
| 2009/0319548 A1* | 12/2009 | Brown | G06F 17/30566 |
| 2010/0030623 A1 | 2/2010 | Guglani | |
| 2010/0122155 A1* | 5/2010 | Monsarrat | G06Q 30/0217 715/234 |
| 2010/0218167 A1 | 8/2010 | Turner et al. | |
| 2011/0010759 A1 | 1/2011 | Adler | |
| 2011/0025707 A1 | 2/2011 | Fujioka | |
| 2011/0047597 A1 | 2/2011 | Mahaffey | |
| 2011/0078243 A1 | 3/2011 | Carpenter | |

OTHER PUBLICATIONS

Venugopal et al., A Taxonomy of Data Grids for Distributed Data Sharing, Management, and Processing, Jun. 10, 2005.*
Pierce et al., Pierce: Research and Methods in Politics, Chapter 7 pp. 79-99, 2007.*
Webopedia, definition of Data Cleansing, http://www.webopedia.eom/TERM/D/data_cleansing.html, Aug. 3, 2004.*
Casati, et al., Adaptive and Dynamic Service Composition in eFlow, CAiSE '00 Proceedings of the 12th International Conf. on Advanced Information Systems Engineering, 2000.
Gold, et al., Understanding Service-Oriented Software, IEEE Software, vol. 21 Issue 2, Mar. 2004.
Drummond, et al., A Data Broker for Distributed Computing Environments, ICCS '01 Proceedings of the International Conference on Computational Sciences-Part I, 2001.
Modahl, et al., MediaBroker: An Architecture for Pervasive Computing, PERCOM '04 Proceedings of the 2nd IEEE Intntnl Conf. on Pervasive Computing and Communications, 2004.
Mouhib Alnoukari, Applying Adaptive Software Development (ASD) Agile Modeling on Predictive Data Mining Applications: ASD-DM Methodology, Int. Symposium on Info. Tech., 2008.
Cervantes, et al, A Framework for Constructing Adaptive Component-Based Applications: Concepts and Experiences. 7th Symposium on Computer-Based Software Engineering, 2004.
Gui, et al, An Architectural Based Framework for Managing Adaptive Real-time Applications, 35th Euromicro Conference on Software Engineering and Advanced Applications, 2009.
Mena, et al, A Software Retrieval Service Based on Adaptive Knowledge-Driven Agents for Wireless Environments, ACM Transactions on Autonomous & Adaptive Systems, V.1 I.1 2006.
Jeff Kelly, New Online Marketplace Could Boost Data Integration Applications, DataManagement.com, Feb. 18, 200. http://searchdatamanagement.techtarget.com/news/1389686.
Turner, Turning Software into a Service, Computer, vol. 36 Issue 10, Oct. 2003.
Deep Secure, The Deep-Secure Mail Guard Applies Policy Enforcement and Content Checking to Email, Deep Secure Mail Guard Information and Fact Sheet, 2010.
Loser, et al., Master Data Management for Collaborative Service Processes, International Conference on Service Systems and Service Management, Beijing, China, 2004.
Ullman, Information integration using logical views, Theoretical Computer Science—Special issue on the 6th International Conf. on DB Theory—ICDT, vol. 239 Is. 2, May 2000.
Genesereth, et al., Infomaster: an information integration system, SIGMOD '97 Proceedings of the 1997 ACM SIGMOD international conference on Management of data, 1997.
Arens, et al., Query reformulation for dynamic information integration, Journal of Intelligent Information Systems, vol. 6 Issue 2-3, Jun. 1996.
Themistocleous, et al., ERP and application integration: Exploratory survey, AMCIS 2001 proceedings.
Lee, et al., Enterprise integration with ERP and EAI, Communications of the ACM, vol. 46 Issue 2, Feb. 2003.
Zeng, et al., QoS-aware middleware for Web services composition, IEEE Transactions on Software Engineering, vol. 30 Issue 5, May 2004.
Zeng, Quality driven web services composition, WWW '03 Proceedings of the 12th international conference on World Wide Web, 2003.
Milanovic, Current Solutions for Web Service Composition, IEEE Internet Computing, vol. 8 Issue 6, Nov. 2004.
Benatallah, et al., The Self-Serv environment for Web services composition, IEEE Internet Computing, vol. 7, Issue 1, Jan./Feb. 2003.

* cited by examiner

OPEN DATA MARKETPLACE FOR MUNICIPAL SERVICES

FIELD

The present application relates generally to computers and applications, and more particularly to open electronic data marketplace in a software-as-a-service platform.

BACKGROUND

In many entities still, in-house IT applications are poorly integrated, for example, with disparate applications running on their own, even when there are commonalities in the data those applications use. In such cases, data updated by one application is usually imported to another application manually. For instance, an IT administrator may have to manually access data updated or used by one application and load on to another application.

Take for example, local or municipal government's IT applications used to support service delivery for the municipalities. Those applications typically are aligned directly to the departmental structure, with application(s) covering only the tasks associated with a single department. However, services offered and provided to citizens often involve the work of many departments. Consider, for example, a parcel that has been recently renovated by its owners. The parcel owner applies for a building permit from the Building department. After the work has been completed and the Certificate of Occupancy has been issued, the Assessor's office must update the parcel details to reflect the renovations and initiate a parcel reassessment. The newly assessed value has to be updated in the tax system for calculation of the property tax liability. Finally, the property tax payments collected by the tax department are directly entered into the tax system, and must later be updated in and reconciled with the accounts of the Finance department's General Ledger. This example describes the complex interactions between four departments as part of the administration for parcel management services including the renovations, assessment and property tax processes.

In many cases, the departments all use distinct, nonintegrated, custom software programs to aid in their work. Additionally, departments may also use paper-based records and manual record-keeping. Municipalities may choose to pay for pair-wise integration between software applications or purchase preintegrated software packages, especially for departments that share information frequently. Departments such as Police and Justice, Assessment and Tax, Personnel and Finance rely heavily on the sharing of information that is central to their work. The Police department must notify the Justice department of arrest and investigation details as input to current and future court cases. The Assessment department must periodically give the Tax department the tax roll, a listing of all taxable parcels, their current assessment values, and valid exemptions. The Personnel department (and/or individual departments) maintains information on employee pay rates, raises, benefits, and work hours. These factors are used to calculate semi-monthly pay to produce payroll checks.

Although municipalities have the choice to pay for integration between independent applications, the cost is usually prohibitive. Additionally, the association of IT applications to a single specific department can be a limiting factor for service offerings. The applications are not flexible to adapt to new needs, therefore the only way currently to have this information reflected in multiple department software is through constant manual transmission and inputting.

BRIEF SUMMARY

A method and system for open data marketplace may be provided. The method, in one aspect, may include identifying one or more data attributes from a plurality of applications registered with a shared data management system and mapping said one or more data attributes to a data model to create a first set of mapped data. The method may also include augmenting said first set of mapped data with additional data imported into the shared data management system from other data locations to create an augmented set of mapped data, and receiving one or more of second set of mapped data from one or more shared data management system associated respectively with one or more shared data management networks. The method may further include enabling of composing a data set by combining and cleansing one or more of said first set of mapped data, said second set of mapped data, and said augmented set of mapped data, and offering said composed data set in a digital marketplace with associated pricing characteristics.

A system for open data marketplace, in one aspect, may include a shared data management module operable to identify one or more data attributes from a plurality of applications registered with a shared data management system. The shared data management module may be further operable to map said one or more data attributes to a data model to create a first set of mapped data. The shared data management module may be further operable to augment said first set of mapped data with additional data imported into the shared data management system from other data locations to create an augmented set of mapped data. The shared data management module may be further operable to receive one or more of second set of mapped data from one or more shared data management system associated respectively with one or more shared data management networks, enable composing of a data set by combining and cleansing one or more of said first set of mapped data, said second set of mapped data, and said augmented set of mapped data. The shared data management module may be further operable to offer said composed data set in a digital marketplace with associated pricing characteristics.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Shared data management (SDM) enables platform-mediated data sharing among applications, for example, in Software-as-a-Service platform. Software-as-a-Service or SaaS refers to providing the use of software or application as a service on demand, for instance, by subscription, e.g., in a "pay-as-you-go" model. A customer or a user subscribes for the use of a software application, for instance, as needed by the customer. Typically, an application being provided as a service is resident in a remote platform which a customer may access via a network (e.g., the Internet via a browser or the like interface). The remote platform may include a number of different applications. For instance, a provider of SaaS provides a computing platform and resources for running applications. The applications need not have been developed by the provider, but may have been deployed and set up on the platform by independent software vendors. SDM provides a common database system, a common data object schema or model, and logic or algorithms for enabling those applications to share data. SDM is described in detail in co-owned U.S. patent application Ser. No. 13/051,303 entitled, "Shared Data Management in Software-As-A-Service Platform" and filed on Mar. 18, 2011, which application is incorporated by reference herein in its entirety. Co-owned U.S. patent application Ser. No. 13/163,177 entitled, "Dynamic Application Adaptation in Software-As-A-Service Platform" and filed on Jun.17, 2011 describes dynamic application adaptation, co-owned U.S. patent application Ser. No. 13/163,373 entitled, "Enforcing Data Sharing Policy through Shared Data Management" and filed on Jun. 17, 2011 describes enforcing data sharing. Those applications are incorporated herein by reference in their entirety.

Figure 1:
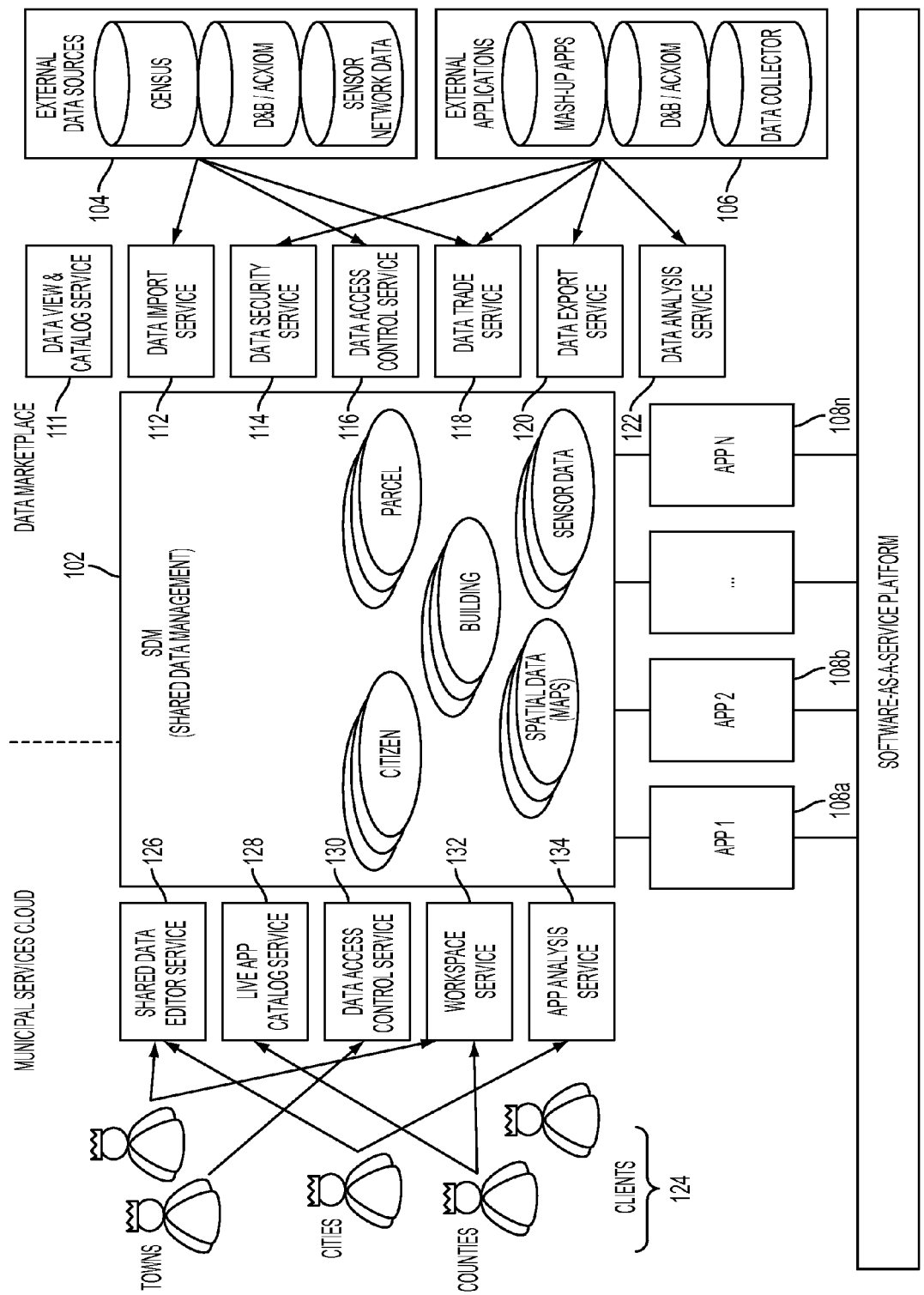
FIG. 1 is a diagram illustrating components of data marketplace for municipal services in one embodiment of the present disclosure.

FIG. 1 is a diagram illustrating components of data marketplace for municipal services in one embodiment of the present disclosure. SDM 102 in one embodiment of the present disclosure may generate a consolidated database of local government operations and applications and function as a data marketplace. Data related to municipalities, citizens, land parcels, which may be fragmented over multiple levels of government, their departments and agencies, and their operations, and over multiple software applications with individual databases may be consolidated. Consolidation may be performed among entities within a government domain, e.g., across multiple levels of governments, government departments and agencies, and multiple applications.

Consolidation may be also performed to include data from other sources 104, e.g., census data, other data from information providing companies such as Dun & Bradstreet and Acxiom, sensor network data such as transit data, for comprehensive, consolidated consistent views. The consolidated data may be offered through a market place. For instance, the users (buyers and sellers) may be enabled to trade data with marketplace services implemented on SDM. The marketplace services implemented on SDM may enable users to view and explore the data, provide security, access control, data import, data access and export, transaction and analysis capabilities. A transaction refers to a software support for executing an agreement between a buyer and a seller to exchange a data asset for payment. It also implies a database transaction which comprises a unit of work performed within a database management system (e.g., SDM system) against the SDM database, and treated in a coherent and reliable way independent of other data transactions. The consolidation in one embodiment of the present disclosure provides for a single logical SDM view and the market place services in one or more networks of SDM.

In addition to endogenous data available through an SDM, applications (e.g., 108a, 108b, . . . 108n) running on a SaaS platform (e.g., government data platform) 110 with SDM 102 may be provided with data from external data sources 104, e.g., sensor networks, federal government and census data, commercial demographic information from vendors or third party companies, data mined from social networks. Conversely, data managed by SDM may be offered to external data collectors 104 and applications 106.

A data marketplace of the present disclosure may include one or more of data services, including but not limited to the following services. Data view service 111 enables the users of the marketplace (e.g., buyer and sellers) to view and explore data available in SDM 102. Data import service 112 enables one or more external data sources (sellers) to share their data through SDM 102. This service may be built on SDM 102 to support SDM's functionality, including data stewardship, point-in-time history, source value, document attachments, and rules of visibility. The imported data may be presented on the common shared object model (also referred to as a data model) in SDM 102 and consolidated with data originated from applications 108a, 108b, . . . 108n, deployed on the SaaS platform 110.

Data catalog service 111 enables external data sources 104 to generate a "trading data set". A "trade data set" includes a set of business objects and its attributes to be offered or requested. This service also enables a policy or constrains to be specified at business object or attribute level. Data security service 114 provides authentication and authorization services to the users of the open data marketplaces, e.g., sellers and buyers. Authentication is the process of verifying a claim made by a subject that it should be allowed to act on behalf of a given principal (e.g., person, computer, process, and other). In a computer system like the data marketplace system of the present disclosure, authentication may be performed with a user logging in to the system with a user name and a password. Authorization involves verifying that an authenticated subject has permission to perform certain operations or access specific resources. In the data marketplace system of the present disclosure in one embodiment, the services authorized to buyers and sellers may be different from what is authorized to the administrator. In addition, there may be different levels of services or privileges authorized to different levels of the users (buyers and sellers), e.g., standard users vs. premium services, and others. The authorization service of the system in one embodiment of the present disclosure controls the access.

Data access control service 116 enables role-based access control over data available through SDM 102. This service may be built on SDM 102 to support its business functionality, including data stewardship, point-in-time history, source value, document attachments, and rules of visibility. Data trade service 118 provides various trade options for buyers and sellers to trade data in the marketplace, for instance, supporting various types of auctions including, but not limited to English auction, Dutch auction, Sealed first-price auction, Vickrey auction, Online Timeshift Auction, Multi-unit auction, Reverse auctions, No-Reverse auction. Trade options refer to fixed-price trade vs. non-fixed price trade (including auctions), monetary trade vs. non-money trade, trade on cash, credit card, paypal or other means of payment.

An English auction is a type of auction, whose most typical form is the "open outcry" auction. The auctioneer opens the auction by announcing a Suggested Opening Bid, a starting price or reserve for the item on sale and then accepts increasingly higher bids from the floor consisting of buyers with a possible interest in the item. Unlike sealed bid auctions, "open outcry" auctions are "open" or fully transparent as the identity of all bidders is disclosed to each other bidder during the auction. The highest bidder at any given moment is considered to have the standing bid, which can only be displaced by a higher bid from a competing buyer. If no competing bidder challenges the standing bid within a given time frame, the standing bid becomes the winner, and the item is sold to the highest bidder at a price equal to his or her bid. More generally an auction mechanism is considered "English" if it involves an iterative process of adjusting the price in a direction that is unfavorable to the bidders (increasing in price if the item is being sold to competing buyers or decreasing in price in a reverse auction with competing sellers).

A Dutch auction is a type of auction where the auctioneer begins with a high asking price which is lowered until some participant is willing to accept the auctioneer's price, or a predetermined reserve price (the seller's minimum acceptable price) is reached. The winning participant pays the last announced price. This is also known as a "clock auction" or an open-outcry descending-price auction. This type of auction is convenient when it is important to auction goods quickly, since a sale never requires more than one bid. Theoretically, the bidding strategy and results of this auction are equivalent to those in a sealed first-price auction.

A first-price sealed-bid auction is a form of auction where bidders submit one bid in a concealed fashion. The submitted bids are then compared and the person with the highest bid wins the award, and pays the amount of his bid to the seller. A Vickrey auction is a type of sealed-bid auction, where bidders submit written bids without knowing the bid of the other people in the auction, and in which the highest bidder wins, but the price paid is the second-highest bid. The auction was created by William Vickrey. This type of auction is strategically similar to an English auction, and gives bidders an incentive to bid their true value. Online Time shift Auctions is similar to English auction but it can provide more accurate information about the interest in the auctioned item, avoid auction snipping, and encourage early bidding. A multiunit auction is an auction in which several items are sold. The units can be sold each at the same price (a uniform price auction) or at different prices (a discriminatory price auction). A reverse auction is a type of auction in which the roles of buyers and sellers are reversed. In an ordinary auction (also known as a forward auction), buyers compete to obtain a good or service, and the price typically increases over time. In a reverse auction, sellers compete to obtain business, and prices typically decrease over time.

Data export service 120 enables one or more external applications 106 (e.g., buyers) to access data through the SDM 102. The external application 106 accesses data in read-only mode in one embodiment of the present disclosure. A data buyer who has one or more applications may make a trade in the data marketplace system. Once the transaction is completed, the data export service 120 provides one or mechanisms through which the buyer's applications can access the purchased data in SDM. One such mechanism can be private data storage where the applications can read the data by using data query languages; another mechanism can be a set of application programming interface (API) which can be used by the application to directly read the purchased data in SDM. The buyer's applications may access the purchased data through one or more of the mechanisms provided by the data export service 120. The data marketplace system monitors the data transfer to ensure it accords the agreement made in the data trade transaction. Data analysis service 122 may analyze the data and data transfer.

SDM 102 as described above also enables platform-mediated data sharing among applications, for example, in Software-as-a-Service platform 110. A customer or a user 124 subscribes for the use of a software application 108a, 108b, . . . 108n, for instance, as needed by the customer. Shared data editor service 126 enables users (administrators) to specify permissions to the shared objects. Live application catalog service 128 enables the display or presentation of a multitude of applications available for subscription in the platform. Because new applications may be added to the platform and existing applications can be removed from the system or hidden from one or more sets of the users, the catalog of the applications can be dynamically updated. Data access control service 130 enables the authentication and authorization of various users of the system, for example, as described above with reference to 116. Workspace service 132 enables the administrator to view and work on tentative systems after making any changes to the permissions of applications in SDM but before deploying to the end users. Application analysis service 134 enables to collect, analyze and report of the use (subscription) of the applications by the users.

Figure 2:
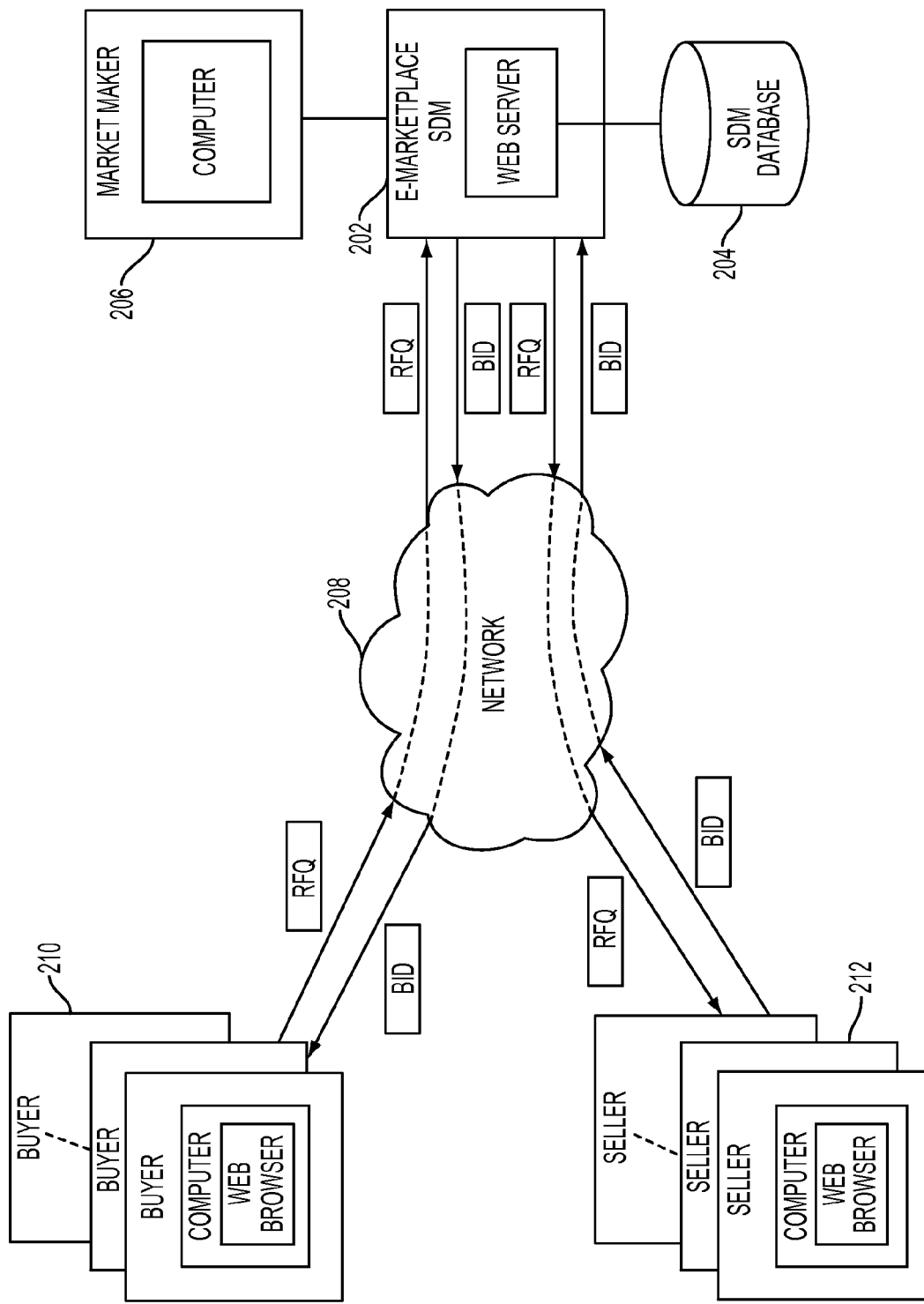
FIG. 2 is an architectural overview of a data marketplace in one embodiment of the present disclosure.

FIG. 2 is an architectural overview of a data marketplace in one embodiment of the present disclosure. SDM 202 may function as an electronic marketplace for buying and selling data. SDM 202 may include a web server for enabling web functionalities such that clients (e.g., buyer 210 and seller 212) may interact via a network such as the Internet 208 using user interfaces such as web browsers. SDM 202 also may include a database 204 which store the data that is purchased and sold. Market maker 206 may be an operator or administrator of the data marketplace system. The market maker 206 provides the functionalities of the services shown in FIG. 1, e.g., 111 to 122.

In FIG. 2, the architecture of the electronic data-marketplace (e-marketplace) includes one or more buyers 210 accessing Web browser programs via one or more computers. The buyers 210 submit Request for Quotations (RFQ) via the web browser programs over a network 208 to an e-marketplace 202, for example, implemented by a web server. The web server stores the RFQ as well as other information such as, for example, product catalogs, seller and buyer information and others in a database system. A market maker 206 may operate the e-marketplace 202 via a computer. Once the RFQ is submitted, the e-marketplace 202 posts the RFQ as a new market on the web server.

One or more sellers 212 may access the e-marketplace over the network 208 via a web browser program residing on a seller computer. The web browser programs and both the buyer and the seller, respectively, as well as the web server may use HyperText Transfer Protocol (HTTP). The sellers may find and access the posted RFQ via the web browser program, and thereafter submit one or more sell bids having attribute values to the e-marketplace via the network. The sell bid and associated attribute values may be stored in the database as well as transmitted to the buyer's web browser over the network. Also, the web pages associated with both of the web browser programs and may provide a structured form for entering the appropriate information such as, for example, the RFQ and the submitted bids.

Figure 3:
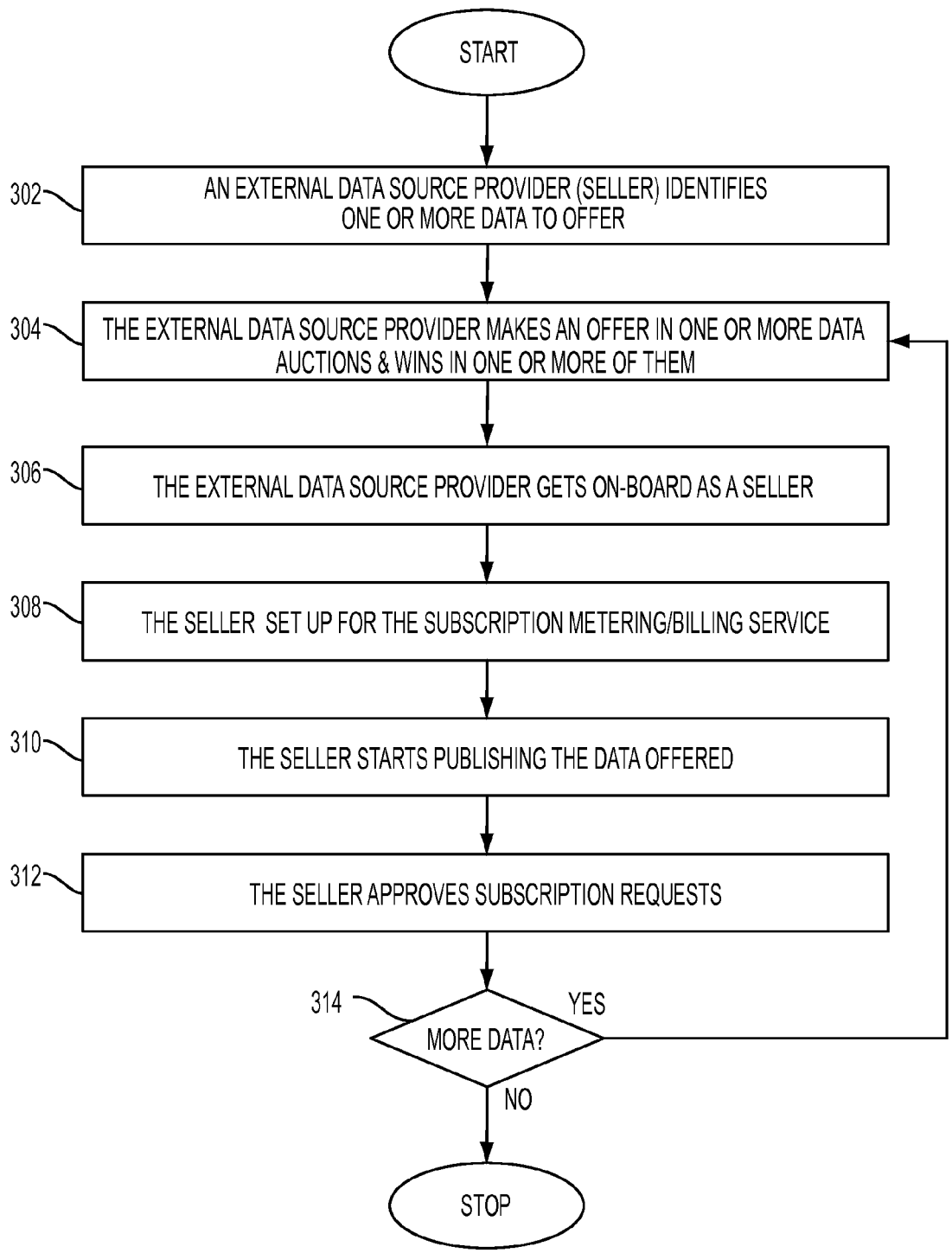
FIG. 3 is a flow diagram illustrating a method of data marketplace associated with selling data through the data marketplace in one embodiment of the present disclosure.

FIG. 3 is a flow diagram illustrating a method of data marketplace associated with selling data through the data marketplace in one embodiment of the present disclosure. At 302, communication from an external data source provider (e.g., seller) is received, which identifies one or more data the external data source provider is offering. At 304, the identified data is offered in one or more data auctions provided by SDM. The seller wins in one or more of them. At 306, the external data source provider is enabled to get on-board as a seller. In one aspect, the data schema of the external data sources are viewed and mapped to the common data schema of SDM—this can be automated by mapping the attribute names in both schema. Once the mapping is set, a set of API (Application Programming Interface) or Web Service Calls enable linking the data source and the SDM database. Via a set of API (Application Programming Interface) or Web Service Calls, data transfer may be executed so that the data from the external source is stored and consolidated with other data available in SDM. The data from the external source, consolidated in SDM, is available for trade in the marketplace.

At 308, the seller is enabled to set up for the subscription metering/billing service. In one aspect, an agreement between the seller and SDM operator may be established about pricing of the data. An example of pricing is a utility pricing, for example, like water and electricity, the price of data is determined by the use or the amount that is sold in the marketplace. Other agreement on pricing such as dynamic pricing by auction, or fixed price is also possible. Once the pricing model is set, the marketplace system monitors and collects the usage information associated with the data. This is referred to as metering. There may be additional factors in pricing model such as margin for the marketplace operator, and others. Considering the additional factors to the price, a billing may be determined.

At 310, the seller is enabled to start publishing the data offered. At 312, the seller is enabled to approve subscription requests. The seller's data becomes available in SDM. When a subscription request is received from a buyer, the data can be exported to the buyer with the seller's approval. At 314, if there are more data identified to be offered, the logic continues to step 304.

Figure 4:
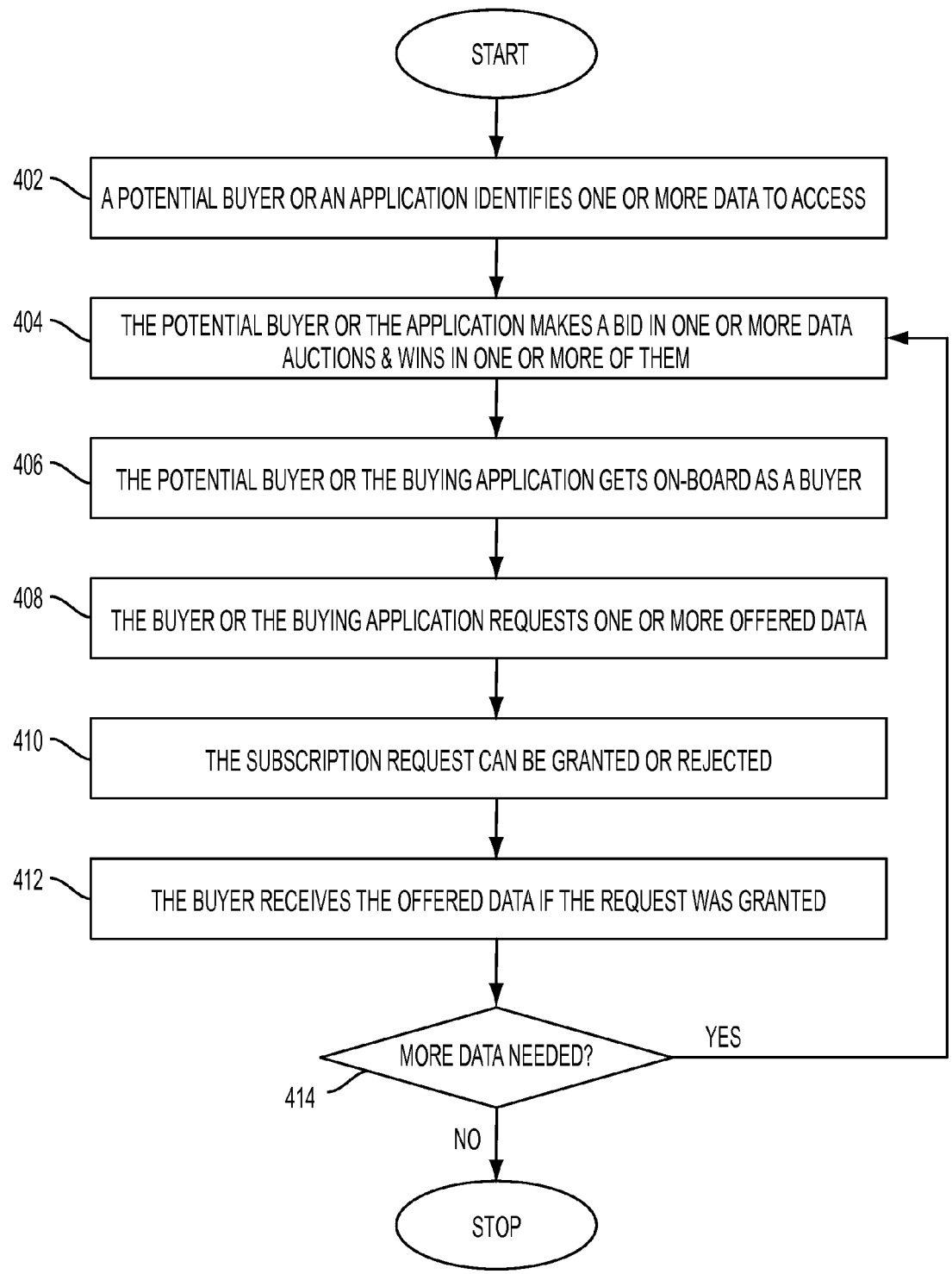
FIG. 4 is a flow diagram illustrating a method of data marketplace associated with buying data through the data marketplace in one embodiment of the present disclosure.

FIG. 4 is a flow diagram illustrating a method of data marketplace associated with buying data through the data marketplace in one embodiment of the present disclosure. At 402, communication is received from a potential buyer or an application identifying one or more data to access. At 404, the potential buyer or the application is enabled to make a bid in one or more data auctions. The potential buyer wins in one or more of them. A data buyer who has one or more applications make a trade in the data marketplace system. The trade can be made in the marketplace by using the data trade service (FIG. 1 at 118) described above including various auction services. Once the transaction is completed, the data export service provides one or more mechanisms through which the buyer's applications can access the purchased data from SDM. A means can be a private data storage where the applications can read the data by using data query languages; another means can be a set of application programming interface (API) which can be used by the application to directly read the purchased data in SDM. The buyer's applications access the purchased data through the means provided by the data export service. The data marketplace system monitors the data transfer to ensure it accords with the agreement made in the data trade transaction. At 406, the potential buyer or the buying application is enabled to get on-board as a buyer. At 408, requests for one or more offered data are received from the buyer or the buying application. Once the plumbing (API or others as described above) for data transfer is set between the buyer's application and SDM through the data export service, the marketplace is ready for receiving data transfer request from the buying applications.

At 410, the subscription request may be granted or rejected. The subscription request is nothing but data transfer request from the buying applications. Often the request is a series of (periodic) requests in a subscription mode depending on the application. With all the plumbing set between the seller & SDM and also between buyer & SDM. The seller receives requests form the buyer, grant or deny them, and SDM does the data transfer through the data export service for the granted requests.

At 412, the offered data is transmitted to the buyer or the buying application in response to the request being granted. A stream of data bits from the SDM database may be grouped as data files. In one embodiment, the underlying network protocol to transmit the data may include but is not limited to file transfer protocol (FTP), TCP/IP, HTTP, and/or others. At 414, if more data is identified, the logic continues to 404.

Figure 5:
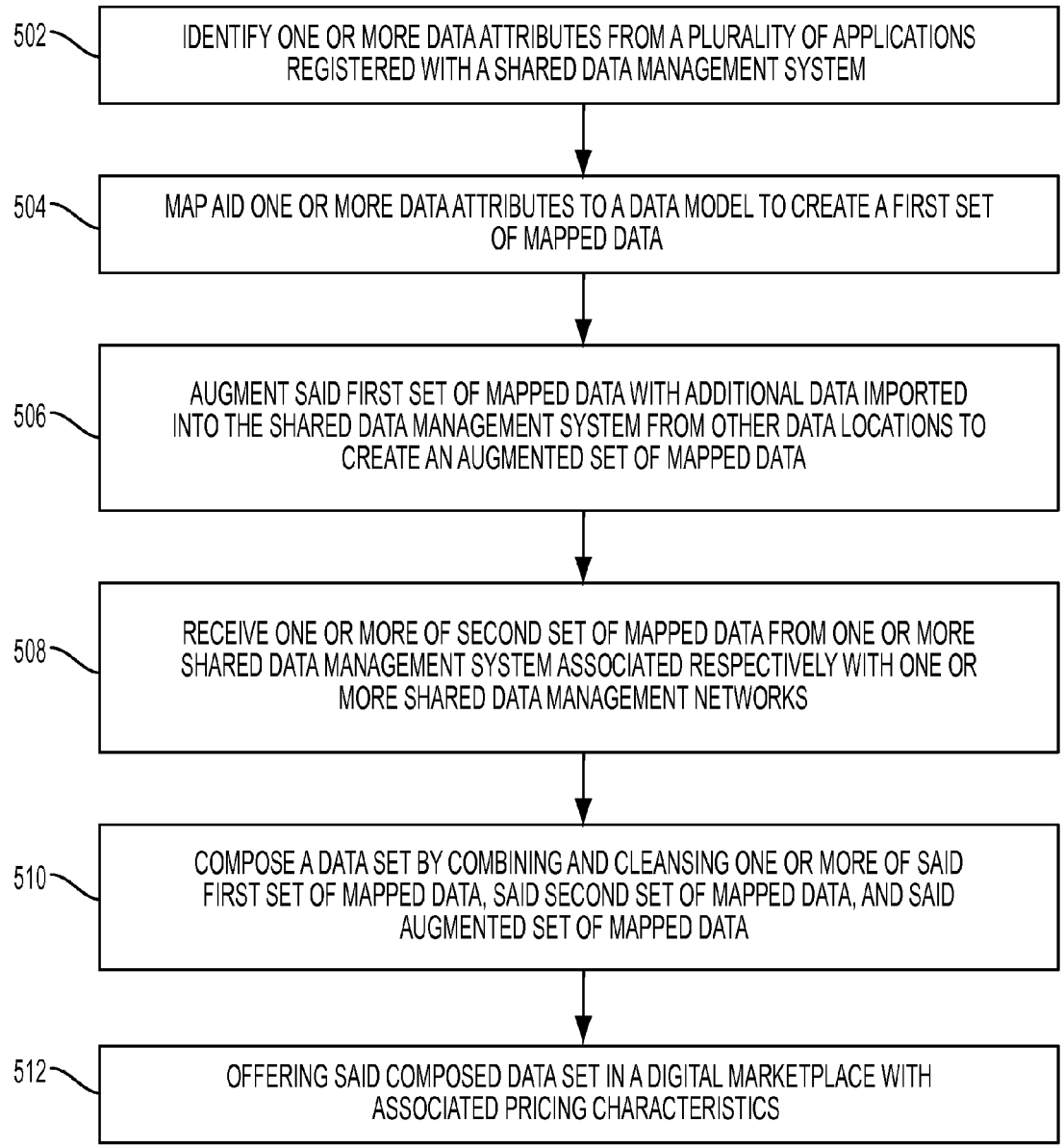
FIG. 5 is a flow diagram illustrating a method of the present disclosure in another aspect.

FIG. 5 is a flow diagram illustrating a method of open market place in another aspect. At 502 one or more data attributes are identified from a plurality of applications registered with a shared data management system. Data attributes are different properties or "attributes" that describe master data objects such as citizen or land parcel. As an example, a parcel data object's attributes are shown in Table 1.

TABLE 1

| ATTRIBUTE | TYPE | DETAILS |
| --- | --- | --- |
| ID | string | Section, Block, Lot SBL identifier, also known as the tax map number. |
| Userid | string | Userid of the person managing this parcel |
| LegalAddrNum | number | Street number for the physical location of the parcel |
| LegalAddrStreet | string | Street name on which the parcel is physically located |
| LegalAddrCity | string | Name of city in which the parcel is physically located |
| LegalAddrState | string | Name of state in which the parcel is physically located |
| LegalAddrZip | number | Postal zip code for parcel's physical location |
| OwnerOneName | string | The name or corporation title of the primary owner of the parcel |
| OwnerTwoName | string | The name or corporation title of parcel's co-owner |
| AdditionalOwners | string | Names of any additional owners |
| OwnershipType | string | Type of ownership e.g. Association, Commercial, Time Share |
| MailingAddrNum | number | Street number for the address in which correspondence regarding parcel should be mailed |
| MailingAddrStreet | string | Street name for the address in which correspondence regarding parcel should be mailed |
| MailingAddrCity | string | Name of city for the address in which correspondence regarding parcel should be mailed |
| MailingAddrState | string | Name of state for the address in which correspondence regarding parcel should be mailed |
| MailingAddrZip | number | Postal zip code for the address in which correspondence regarding parcel should be mailed |

TABLE 1-continued

| ATTRIBUTE | TYPE | DETAILS |
|---|---|---|
| ContactPhoneNumber | string | Phone number used to contact parties responsible for parcel |
| 3rdPartyMailingAddrNum | number | Street number for the address in which third party notification correspondence should be mailed |
| 3rdPartyMailingAddrStreet | string | Street name for the address in which third party notification correspondence should be mailed |
| 3rdPartyMailingAddrCity | string | Name of city for the address in which third party notification correspondence should be mailed |
| 3rdPartyMailingAddrState | string | Name of state for the address in which third party notification correspondence should be mailed |
| 3rdPartyMailingAddrZip | number | Postal zip code for the address in which correspondence regarding parcel should be mailed |
| 3rdPartyPhoneNumber | string | Phone number used for third party notifications |
| SchoolDistrict | string | Name of the school district |
| ... | ... | ... |

At 504, the identified one or more data attributes are mapped to a data model to create a first set of mapped data. For example, data attributes in the data model schema of an application are mapped to those in the common object model of SDM.

At 506, the first set of mapped data may be augmented with additional data imported into the shared data management system from other data locations to create an augmented set of mapped data. SDM provides a common and comprehensive data model which encompasses and consolidates individual data models used by different applications. The development of this consolidated SDM data model may be incrementally performed by adding data models of applications one by one. Once the first application's attributes are added to the SDM data model, the second application's attributes not covered by the first application may be added (augmented) to the SDM model.

At 508, one or more of second set of mapped data may be received from one or more shared data management system associated respectively with one or more shared data management networks.

At 510, a data set may be composed by combining and cleansing one or more of said first set of mapped data, said second set of mapped data, and said augmented set of mapped data. A data set refers to a data model of an application. The SDM data model is a comprehensive model combining the models of many applications. Often this composing process requires human intervention due to its semantic-heavy nature which cannot be easily automated by machine, for example, to remove duplicated (same meaning) attributes with different names from different applications or keeping different attributes with similar or same names from different applications. This process is referred to as composing. Cleansing includes removing duplicated (same meaning) attributes with different names from different applications or keeping different attributes with similar or same names from different applications. At 512, the composed data set may be offered in a digital marketplace with associated pricing characteristics.

In one aspect, SMD of the present disclosure may identify a quality measure based on voting or certification or both, the quality measure associated with characteristics of authenticity, reliability, and accuracy of database associated with said other data locations or the plurality of applications contributing to said data set. SDM in one embodiment of the present disclosure may also quantify value of the data set based on characteristics associated with availability of data forming the data set, difficulty in procuring the data and potential use of the augmented and composed data set. A pricing to the data set may be automatically assigned based on the quantified value and the quality measures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for open data marketplace, comprising:
identifying, by a processor, one or more data attributes of data objects used by a plurality of applications registered with a shared data management system provided on software as a service platform, said one or more data attributes specified in data schemas of the plurality of applications;
mapping, by the processor, said one or more data attributes to a data model to create a first set of mapped data, the data model being a common data object schema provided by the shared data management that allows data trading and viewing of the data attributes in said data model, the mapping comprising mapping attribute names of said one or more data attributes in the data schemas of the plurality of applications to attribute names of the common data object schema;
receiving from the plurality of applications data content associated with the mapped attribute names and storing the data content in a shared data management database providing the common data object schema;
augmenting, by the processor, said first set of mapped data with additional data imported into the shared data management system from other data locations to create an augmented set of mapped data;
receiving, by the processor, one or more of a second set of mapped data from one or more second shared data management systems associated respectively with one or more shared data management networks;
enabling, by the processor, of composing of a data set by combining and cleansing one or more of said first set of mapped data, said second set of mapped data, and said augmented set of mapped data, the combining and cleansing comprising at least removing duplicated attributes with different names from different applications of the plurality of applications, and keeping different attributes with same names from different applications of the plurality of applications, wherein the data set is composed to comprise attribute names from the common data object schema, and generating a consolidated database of the plurality of applications; and
offering, by the processor, said composed data set in a digital marketplace by an auction,
wherein the plurality of applications deployed on the software as a service platform are allowed to exchange one or more data objects of the composed data set via the digital marketplace auction by requesting data trades and accepting data trade requests,
wherein a data export service allows an application requesting data trade to access the one or more data objects by at least providing a private data storage wherein the application can read the one or more data objects by data query language or by providing a set of application programming interface to allow the application to directly read the one or more data objects in the shared data management system,
the data trades between the plurality of applications integrating the plurality of applications that are running separately on at least one hardware processor.

2. The method of claim 1, further including:
identifying a quality measure based on voting or certification or both, the quality measure associated with characteristics of authenticity, reliability, and accuracy of database associated with said other data locations or the plurality of applications contributing to said data set.

3. The method of claim 1, further including:
displaying trade options for one or more buyers and sellers to trade said augmented set of mapped data.

4. The method of claim 2, further including:
automatically assigning a pricing to the data set based on the quantified value and the quality measures.

5. The method of claim 3, further including:
authenticating a buyer and a seller in response to a trade option being approved by the buyer and the seller.

6. The method of claim 5, further including:
exporting purchased augmented data to said buyer from said shared data management system.

7. A non-transitory computer readable storage medium storing a program of instructions executable by a machine to perform a method of for open data marketplace, comprising:
identifying one or more data attributes of data objects used by a plurality of applications registered with a shared data management system provided on software as a service platform, said one or more data attributes specified in data schemas of the plurality of applications;
mapping said one or more data attributes to a data model to create a first set of mapped data, the data model being a common data object schema provided by the shared data management that allows data trading and viewing of the data attributes in said data model, the mapping comprising mapping attribute names of said one or more data attributes in the data schemas of the plurality of applications to attribute names of the common data object schema;

receiving from the plurality of applications data content associated with the mapped attribute names and storing the data content in a shared data management database providing the common data object schema;

augmenting said first set of mapped data with additional data imported into the shared data management system from other data locations to create an augmented set of mapped data;

receiving one or more of a second set of mapped data from one or more second shared data management systems associated respectively with one or more shared data management networks;

enabling of composing a data set by combining and cleansing one or more of said first set of mapped data, said second set of mapped data, and said augmented set of mapped data, the combining and cleansing comprising at least removing duplicated attributes with different names from different applications of the plurality of applications, and keeping different attributes with same names from different applications of the plurality of applications, wherein the data set is composed to comprise attribute names from the common data object schema, and generating a consolidated database of the plurality of applications; and offering said composed data set in a digital marketplace by an auction, wherein the plurality of applications deployed on the software as a service platform are allowed to exchange one or more data objects of the composed data set via the digital marketplace auction by requesting data trades and accepting data trade requests, wherein a data export service allows an application requesting data trade to access the one or more data objects by at least providing a private data storage wherein the application can read the one or more data objects by data query language or by providing a set of application programming interface to allow the application to directly read the one or more data objects in the shared data management system, the data trades between the plurality of applications integrating the plurality of applications that are running separately on at least one hardware processor.

8. The computer readable storage medium of claim 7, further including:
identifying a quality measure based on voting or certification or both, the quality measure associated with characteristics of authenticity, reliability, and accuracy of database associated with said other data locations or the plurality of applications contributing to said data set.

9. The computer readable storage medium of claim 8, further including:
automatically assigning a pricing to the data set based on the quantified value and the quality measures.

10. The computer readable storage medium of claim 9, further including:
displaying trade options for one or more buyers and sellers to trade said augmented set of mapped data.

11. The computer readable storage medium of claim 10, further including:
authenticating a buyer and a seller in response to a trade option being approved by the buyer and the seller.

12. The computer readable storage medium of claim 11, further including:

exporting purchased augmented data to said buyer from said shared data management system.

13. A system for open data marketplace, comprising:
a processor; and
a shared data management module operable to execute on the processor and further operable to identify one or more data attributes of data objects used by a plurality of applications registered with a shared data management system provided on software as a service platform, said one or more data attributes specified in data schemas of the plurality of applications, the shared data management module further operable to map said one or more data attributes to a data model to create a first set of mapped data, the data model being a common data object schema provided by the shared data management module that allows data trading and viewing of the data attributes in said data model, the shared data management module mapping attribute names of said one or more data attributes in the data schemas of the plurality of applications to attribute names of the common data object schema, the shared data management module further operable to receive from the plurality of applications data content associated with the mapped attribute names and store the data content in a shared data management database providing the common data object schema, the shared data management module further operable to augment said first set of mapped data with additional data imported into the shared data management system from other data locations to create an augmented set of mapped data, the shared data management module further operable to receive one or more of a second set of mapped data from one or more shared data management systems associated respectively with one or more shared data management networks, enable composing of a data set by combining and cleansing one or more of said first set of mapped data, said second set of mapped data, and said augmented set of mapped data, the combining and cleansing comprising at least removing duplicated attributes with different names from different applications of the plurality of applications, and keeping different attributes with same names from different applications of the plurality of applications, wherein the data set is composed to comprise attribute names from the common data object schema, and generating a consolidated database of the plurality of applications, the shared data management module further operable to offer said composed data set in a digital marketplace by an auction, wherein the plurality of applications deployed on a software as the service platform are allowed to exchange one or more data objects of the composed data set via the digital marketplace auction by requesting data trades and accepting data trades requests, wherein a data export service allows an application requesting data trade to access the one or more data objects by at least providing a private data storage wherein the application can read the one or more data objects by data query language or by providing a set of application programming interface to allow the application to directly read the one or more data objects in the shared data management system, the data trades between the plurality of applications integrating the plurality of applications that are running separately on at least one hardware processor.

14. The system of claim 13, wherein the shared management module is further operable to display trade options for one or more buyers and sellers to trade said augmented set of mapped data.

15. The system of claim 14, wherein the shared management module is further operable to authenticate a buyer and a seller in response to a trade option being approved by the buyer and the seller.

16. The system of claim 13, wherein the shared management module is further operable to automatically assign a pricing to the data set.

* * * * *